United States Patent
Humbert et al.

(10) Patent No.: US 11,588,876 B2
(45) Date of Patent: Feb. 21, 2023

(54) DEVICE-SIDE PLAYBACK RESTRICTIONS ON HIGH THROUGHPUT NETWORKS

(71) Applicant: T-Mobile USA, Inc., Bellevue, WA (US)

(72) Inventors: John J. Humbert, Roeland Park, KS (US); Scott Francis Migaldi, Cary, IL (US)

(73) Assignee: T-Mobile USA, Inc., Bellevue, WA (US)

(*) Notice: Subject to any disclaimer, the term of this patent is extended or adjusted under 35 U.S.C. 154(b) by 58 days.

(21) Appl. No.: 16/902,643

(22) Filed: Jun. 16, 2020

(65) Prior Publication Data
US 2021/0392180 A1 Dec. 16, 2021

(51) Int. Cl.
| | | |
|---|---|---|
| H04L 65/75 | (2022.01) | |
| H04W 28/02 | (2009.01) | |
| H04W 88/02 | (2009.01) | |
| H04L 65/612 | (2022.01) | |

(52) U.S. Cl.
CPC ....... H04L 65/764 (2022.05); H04W 28/0278 (2013.01); H04W 88/02 (2013.01)

(58) Field of Classification Search
CPC ............... H04L 65/601; H04L 65/604; H04W 28/0278; H04W 88/02
See application file for complete search history.

(56) References Cited

U.S. PATENT DOCUMENTS

| | | | |
|---|---|---|---|
| 5,914,941 A * | 6/1999 | Janky | H04L 69/04 709/219 |
| 8,874,964 B1 * | 10/2014 | Lakshminarayanan | H04N 21/44209 714/26 |
| 9,264,780 B1 * | 2/2016 | Stoica | H04N 21/6582 |
| 9,521,178 B1 * | 12/2016 | Gigliotti | H04L 47/25 |
| 10,666,698 B1 * | 5/2020 | Joliveau | H04L 65/80 |
| 2002/0026458 A1 * | 2/2002 | Fujinami | H04N 5/783 715/273 |
| 2002/0160784 A1 * | 10/2002 | Kuwahara | H04W 28/26 455/452.1 |
| 2003/0067872 A1 * | 4/2003 | Harrell | H04N 21/23406 370/229 |
| 2003/0163521 A1 * | 8/2003 | Hoshi | H04L 47/22 709/203 |
| 2004/0071088 A1 * | 4/2004 | Curcio | H04L 65/1083 370/235 |
| 2004/0240382 A1 * | 12/2004 | Ido | H04L 65/80 370/229 |
| 2005/0120038 A1 * | 6/2005 | Jebb | H04N 21/2662 |
| 2005/0172028 A1 * | 8/2005 | Nilsson | H04N 21/23406 709/231 |
| 2007/0213038 A1 * | 9/2007 | Masseroni | H04L 47/18 455/414.3 |
| 2008/0171569 A1 * | 7/2008 | Pralle | H04B 1/74 455/525 |
| 2008/0248760 A1 * | 10/2008 | Booker | H04W 52/54 455/88 |

(Continued)

*Primary Examiner* — Jenee Holland
(74) *Attorney, Agent, or Firm* — Lee & Hayes, P.C.

(57) ABSTRACT

A user equipment described herein receives content delivered by a telecommunication network at a first rate. The first rate is a highest rate possible for the telecommunication network. The user equipment then renders the content at a second rate that is lower than the first rate.

12 Claims, 5 Drawing Sheets

(56) References Cited

U.S. PATENT DOCUMENTS

| | | | | |
|---|---|---|---|---|
| 2009/0249405 | A1* | 10/2009 | Karaoguz | H04N 21/6582 725/62 |
| 2009/0249406 | A1* | 10/2009 | Gordon | H04N 21/4334 725/62 |
| 2009/0307367 | A1* | 12/2009 | Gigliotti | H04L 67/02 709/231 |
| 2009/0307368 | A1* | 12/2009 | Sriram | H04N 21/44004 709/231 |
| 2010/0113086 | A1* | 5/2010 | Chang | G07C 5/0891 455/525 |
| 2011/0019623 | A1* | 1/2011 | Funabiki | H04N 21/4122 370/328 |
| 2011/0087797 | A1* | 4/2011 | Costa | H04L 67/2828 709/232 |
| 2011/0238789 | A1* | 9/2011 | Luby | H04L 65/4084 709/219 |
| 2012/0008912 | A1* | 1/2012 | Stevens | H04N 21/4147 386/347 |
| 2012/0311651 | A1* | 12/2012 | Kahn | H04N 21/23805 725/116 |
| 2013/0235847 | A1* | 9/2013 | Li | H04W 36/0022 370/331 |
| 2013/0246582 | A1* | 9/2013 | Lee | H04N 21/44209 709/219 |
| 2014/0040970 | A1* | 2/2014 | Alexander | H04L 67/141 725/116 |
| 2014/0348011 | A1* | 11/2014 | Zirwas | H04M 7/006 370/252 |
| 2015/0012584 | A1* | 1/2015 | Lo | H04L 67/563 709/203 |
| 2015/0086184 | A1* | 3/2015 | Takamune | H04N 21/4325 386/353 |
| 2015/0288737 | A1* | 10/2015 | Lee | H04L 65/608 709/231 |
| 2016/0165587 | A1* | 6/2016 | Durcan | H04W 52/367 370/252 |
| 2016/0323334 | A1* | 11/2016 | Saba | H04L 65/601 |
| 2017/0188260 | A1* | 6/2017 | Zhou | H04W 28/02 |
| 2017/0195393 | A1* | 7/2017 | Su | H04L 65/601 |
| 2017/0237986 | A1* | 8/2017 | Choi | H04W 4/80 348/14.02 |
| 2017/0310729 | A1* | 10/2017 | Bar Yanai | H04L 47/225 |
| 2018/0027039 | A1* | 1/2018 | Moorthy | H04N 21/2401 709/219 |
| 2018/0109587 | A1* | 4/2018 | Spilka | H04L 65/613 |
| 2018/0213296 | A1* | 7/2018 | Kellar | H04N 21/6338 |
| 2020/0036966 | A1* | 1/2020 | Na | H04N 19/103 |
| 2020/0092603 | A1* | 3/2020 | Fairhurst, Sr. | H04N 21/4402 |
| 2020/0186849 | A1* | 6/2020 | Stratton | H04N 21/6373 |

* cited by examiner

DEVICE-SIDE PLAYBACK RESTRICTIONS ON HIGH THROUGHPUT NETWORKS

BACKGROUND

Cellular communication devices, such as mobile devices, use network radio access technologies to communicate wirelessly with geographically distributed cellular base stations. Long-Term Evolution (LTE) is an example of a widely implemented radio access technology that is used in $4^{th}$-Generation (4G) communication systems. New Radio (NR) is a newer radio access technology that is used in $5^{th}$-Generation (5G) communication systems. Standards for LTE and NR radio access technologies have been developed by the 3rd Generation Partnership Project (3GPP) for use by wireless communication carriers.

NR radio access technology is typically used for user-plane communications of data, such as video data, at high speeds. The radio frequency spectrum used for NR transmissions is limited and sometimes cannot meets the demands made of it by all the desired deliveries. Thus, while certain types of content, types of subscribers, and types of services may not call for a delivery at a best available throughput rate, delivery over such limited spectrum at a lower rate creates needless bottlenecks.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
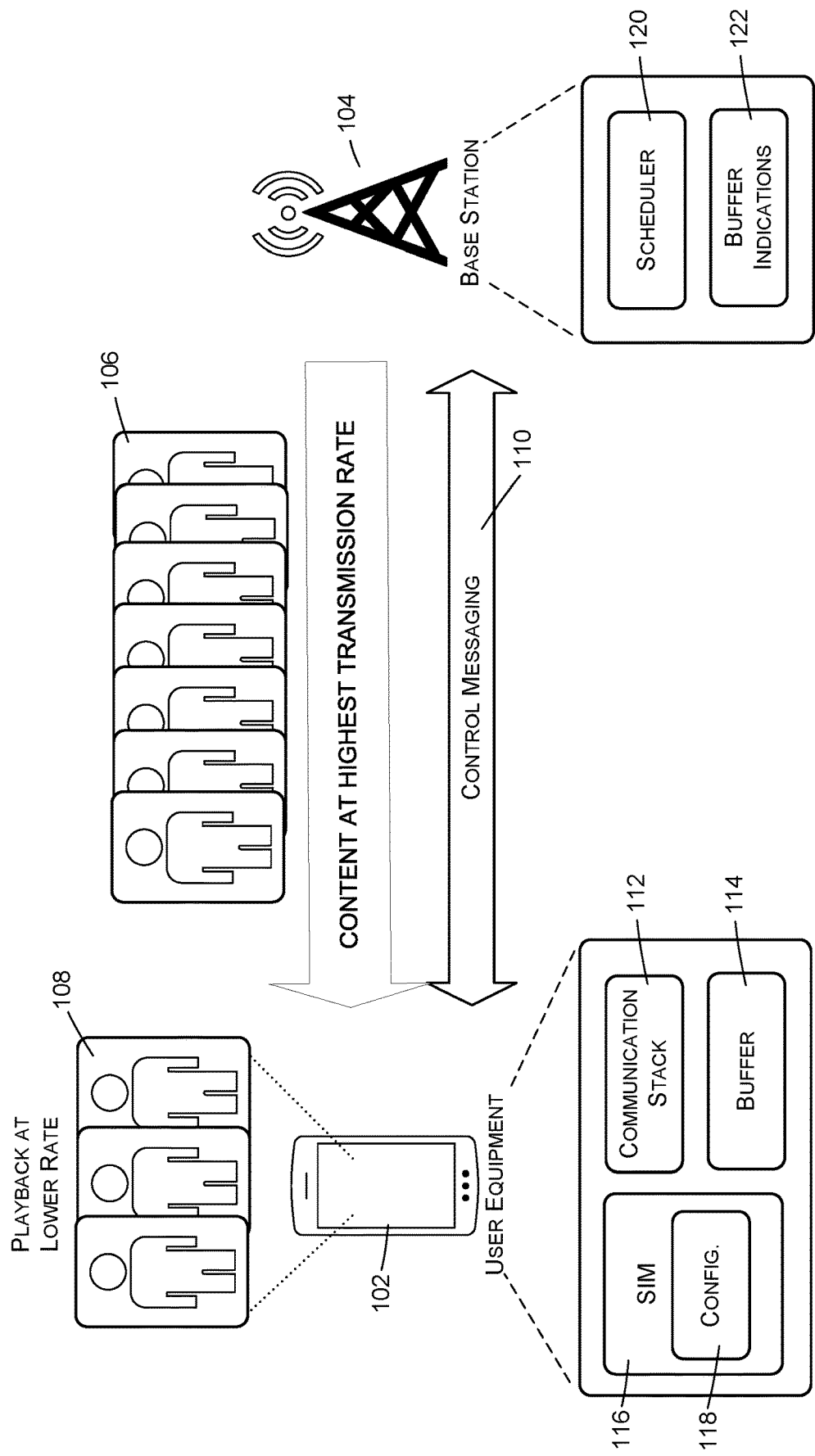
FIG. 1 is an overview diagram illustrating example devices, device components, and network interactions involved in the transmission of content at a highest rate for a network and its playback on a user equipment (UE) restricted to a second, lower rate.

Described herein are techniques for receiving content that is transmitted to a UE by a telecommunication network at a first rate and rendered on the UE at a second rate. The second rate is less than the first rate, and the first rate may be a highest rate possible for the telecommunication network.

In various implementations, the second rate (also referred to herein as the "playback rate") is determined based on at least one of a type of the content, a service associated with the content, or a type of subscriber associated with the UE. Such a rate may be determined by a base station of the communication network and sent to the UE via a control message. Alternatively, the second rate may be included in a configuration and stored on a subscriber identity module (SIM) of the UE. In some implementations, the configuration may include multiple rates for multiple corresponding content types or services and the UE may identify the correct rate based on the content type/service and the configuration. For example, playback of a video call may be at one playback rate and playback of streaming Internet content may be at another, different playback rate.

Regardless of the playback rate for the content, the first rate (also referred to herein as the "transmission rate") is set to a highest throughput rate (or an otherwise unthrottled rate or at a rate within a threshold amount of a highest throughput rate) for the wireless spectrum used by the telecommunication network for the transmission. In other technologies, playback rate is set to transmission rate, and transmission rate varies based on subscriber type, content type, or service. Such technologies are akin to a slow car in the "fast lane"—or only lane—of traffic, creating an artificial bottleneck where none need exist. Accordingly, the telecommunication network described herein transmits content at the highest throughput rate and relies on the UE to apply any restriction or "slowing" to content playback. This enables maximum utilization of any given spectrum and enables any given amount of spectrum to support more throughput.

Playback at a lower rate than transmission may result in too much data awaiting playback at the UE, especially if the user of the UE is, e.g., streaming a large video file. To avoid excess transmission, the UE may store content as it is received in a buffer at the UE and playback/render the content from that buffer. If a first buffer threshold is met (e.g., indicating that the buffer is "full" or has enough data), the UE may signal to a base station of the telecommunication network a request to pause transmission. The base station may then pause transmission, and the UE may continue to render content from the buffer. When the size of the buffer drops to a second buffer threshold, the UE may request resumption of content transmission, and the base station may resume sending content to the UE. While transmission of content to the UE is paused, the base station may transmit the same or different content to a different UE, also at the highest throughput rate. By doing so, the spectrum of the telecommunication network may always be used at the highest rate while no UE will receive more content than it is prepared to buffer or use.

In some implementations, the base station of the telecommunication network described herein may be two base stations in a Non-Standalone (NSA) arrangement having a master base station in a master-secondary relationship with a secondary base station. Further, the base station described herein may be more than two base stations in one or more NSA arrangements, as a UE may be connected to multiple eNodeBs and/or multiple gNodeBs. The master base station may be responsible for control-plane communications for both base stations and the secondary base station may engage only in user-plane communications, such as content transmission. In one example, the master base station may be a Long-Term Evolution (LTE) base station (referred to as a Master eNodeB or MeNB) and the secondary base station may be a New Radio (NR) base station (referred to as a Secondary gNodeB or SgNB). In such an example implementation, the base station transmitting the content at the highest throughput may be the SgNB, and the MeNB may be responsible for conveying one or more of playback rate indications, pause requests, playback resumption requests, buffer status indicators, etc. between the UE and the SgNB. In alternative implementations, the base station may be a standalone gNodeB and may communicate is own control messaging, either in a control-plane or encapsulated within user-plane packet frames.

FIG. 1 is an overview diagram illustrating example devices, device components, and network interactions involved in the transmission of content at a highest rate for a network and its playback on a user equipment (UE) restricted to a second, lower rate. As illustrated, a UE 102 may be wirelessly connected to a base station 104 of a telecommunication network. The base station 104 sends content to the UE 102 at a highest transmission rate 106 for playback at the UE 102 at a playback rate 108. The playback rate 108 may be indicated in control messaging 110 and may be lower than the transmission rate 106. The UE 102 may include a communication stack 112 for receiving control messaging 110 and a buffer 114 for storing received content prior to playback. Also, the UE 102 may include a SIM 116 for storing a configuration 118, which may indicate the playback rate 108. The base station 104 may include a scheduler 120 for determining the transmission rate 106 and the playback rate 108 and buffer indications 122 for storing buffer metrics for the UE 102.

Figure 2:
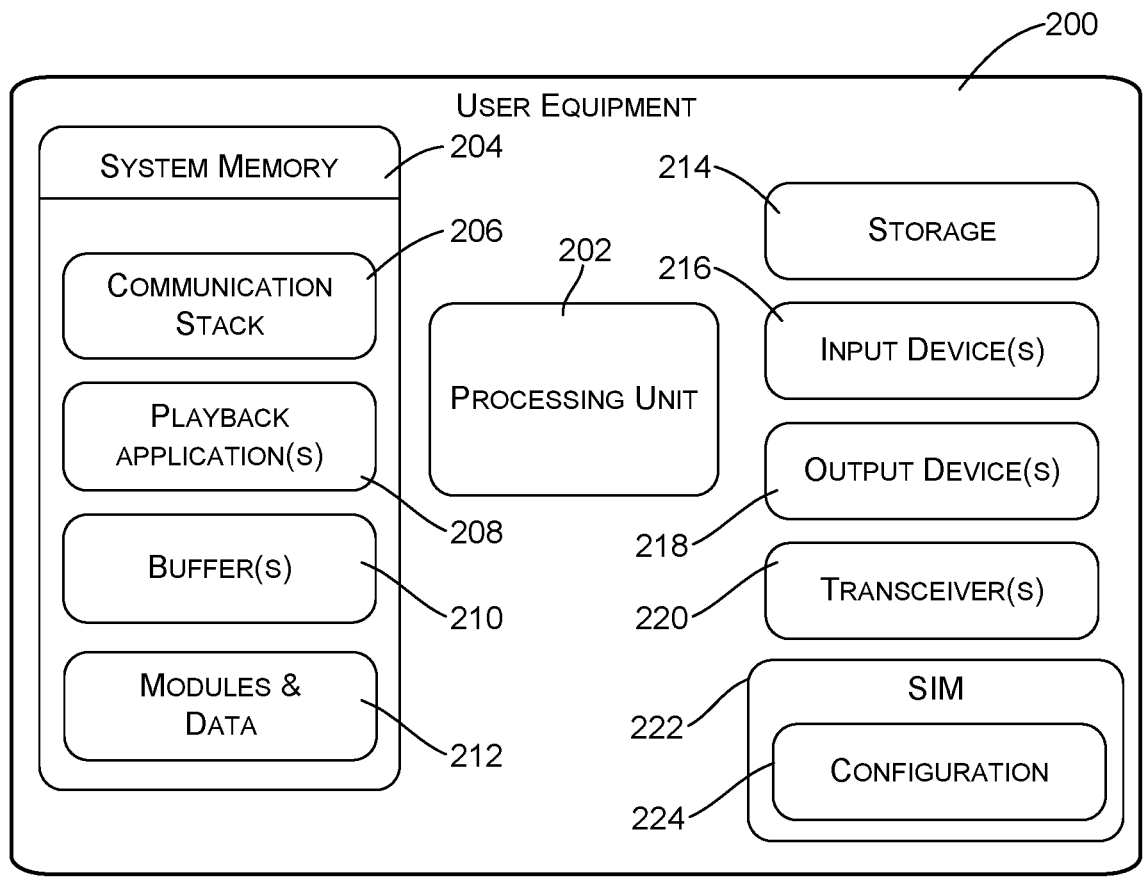
FIG. 2 is a block diagram of an example UE that may implement various functionalities described herein.

FIG. 1 shows a single UE 102, which is one of many such devices that are configured for use with the telecommunication network. The UE 102 may support both 4G LTE and 5G NR networks and communications, a single one of those networks, or any sort of telecommunication network. Further, the UE 102 may comprise any of various types of wireless cellular communication devices that are capable of wireless data and/or voice communications, including smartphones and other mobile devices, "Internet-of-Things" (IoT) devices, smarthome devices, computers, wearable devices, entertainment devices, industrial control equipment, etc. In some environments, the UE 102 may be referred to as a Mobile Station (MS). In some cases or embodiments, the UE 102 may support dual connectivity communications, in which a single communication session concurrently uses both a 4G connection and a 5G connection. More specifically, the UE 102 may operate using NSA, using 5G NR radio technologies to augment 4G LTE communication capabilities. When using NSA, the UE 102 uses both an LTE carrier and an NR carrier for downlink data reception and uplink data transmissions. The LTE carrier may be used for control-plane messaging and for user-plane communications. The NR carrier may be used for additional user-plane bandwidth. An example UE 102 is illustrated in FIG. 2 and is described below in detail with reference to that figure.

In some implementations, the UE 102 may also include a SIM 116, which may be a physical SIM card or virtual SIM (also known as an "eSIM"). The SIM 116 may store subscriber information for the UE 102, such as a mobile station international subscriber identity number (MSISDN), an international mobile subscriber identity (IMSI), an international mobile equipment identity (IMEI), security authentication information, etc. The SIM 116 may also include a configuration or part of a configuration for a UE. For example, the SIM 116 may store a configuration 118 that specifies one or more playback rates 108 for the UE 102. Such playback rates 108 may include a single rate applicable to the subscriber having the UE 102, different rates for different content types or types of services, etc. The configuration may be provided to the UE 102 at the time of the UE's provisioning or at one or more subsequent times.

The UE 102 may also include one or more playback applications, such as video calling clients, calling clients, multimedia messaging clients, streaming clients, games, etc. Such playback applications may each be associated with its own buffer 114 or may share a buffer 114 with other applications (e.g., if the buffer 114 is a buffer of the communication stack 112). These applications may also communicate with one or more remote services through the communication stack 112 and the telecommunication network. Playback applications may also render content to one or more output devices of the UE 102, such as a display, speakers, or a vibrational output. As described further herein, such rendering may be performed at a playback rate 108.

In various implementations, the communication stack 112 may be any sort of protocol stack associated with one or more communication components, such as a modem and/or radio of the UE 102. The communication stack 112 may follow the OSI model and include, for example, a radio link control layer, an application layer, etc. At least a part of the communication stack 112 may define an air interface of the UE 102.

The communication stack 112 may communicate control messaging 110 between the UE 102 and the base station 104 to set up a connection between those devices. Either as part of the messages establishing the connection or after a connection has been established, the communication stack 112 may receive, as part of the control messaging 110, an indication of the playback rate 108 or information that the communication stack 112 utilizes to determine the playback rate. In some implementations, the control messaging 110 from the base station 104 simply specifies the playback rate 108. In other implementations, the communication stack 112 utilizes information such as an indication of content type or service included in the control messaging 110 to determine, e.g., in conjunction with the configuration 118, a playback rate 108. As noted herein, different types of content or different services may be associated with different playback rates 108. Thus, in a number of implementations, the communication stack 112 may determine the playback rate 108 for each content delivery session. In further implementations, the control messaging 110 may not specify a playback rate 108 or include information used to determine that rate; rather, the communication stack 112 may utilize the configuration 118 to determine the playback rate 108. After receiving or determining the playback rate 108, it may be provided to the playback application responsible for rendering the received content.

In various implementations, the received content may be stored in a buffer 114 as it is received and before it is rendered. The buffer 114 may be a single buffer for content received from the network or may be one or more buffers of corresponding applications or platform components. Either logic associated with the buffer 114, the communication stack 112, a platform component, or application(s) may monitor a status of the buffer 114, compare that status to one or more thresholds, send buffer status indications to the base station 104, and send pause/resume requests to the base station 104 when the buffer 114 becomes too full or too empty. For example, because the transmission rate 106 is higher than the playback rate 108, the buffer 114 may fill more quickly with received content than it drains from rendered content. To prevent buffer overflow, the buffer 114 may be compared to a buffer threshold and, if meeting or exceeding the threshold, a request may be sent to the base station 104 to pause the transmission of the content. While transmission is paused, content may continue to be rendered from the buffer 114 and, when a second threshold is met because a buffer size has gotten too low, a further request may be sent to the base station 104 to resume the transmission of the content.

In some implementations, the buffer thresholds may be dynamically configurable and managed by a self-organizing network (SON) of a telecommunication network. Such a SON may take into account network conditions and/or other factors in setting the thresholds. Also or instead, the base station 104 may set the thresholds used for the buffer 114.

In various implementations, the base station 104 may be any sort of base station, such as an LTE/4G base station or a NR/5G base station. The base station 104 may be located at a specific cell site, e.g., on a cell tower, or may be mobile, e.g., on an unmanned aerial vehicle. The base station 104 may include at least one antenna or an antenna array, as well as a computing device and a power source. The computing device of the base station 104 includes at least a scheduler 120 and, in some implementations, buffer indications 122.

As described and shown in FIG. 1, the base station 104 is connected to at least UE 102 and may be connected to a number of UEs. The base station 104 is further connection, via a backhaul, to a core network of the telecommunication network.

In some examples, the base station 104 represents a master-secondary pair of a LTE base station (as master) and a NR base station (as secondary). The LTE base station may be an eNodeB and the NR base station may be a gNodeB. Such a pairing may be an implementation of the NSA architecture, within which the LTE base station/eNodeB may be referred to as a MeNB and the NR base station/gNodeB may be referred to as a SgNB. If base station 104 represents both a MeNB and a SgNB, the control messaging 110 may occur between the UE 102 and the MeNB, and the content may be sent from the SgNB and UE 102 with the highest available 5G speed as the transmission rate 106. The MeNB and SgNB may also communicate with each to, e.g., pass control information between each other.

While an NSA arrangement can include an LTE base station and a NR base station, other base station pairs utilizing different radio access technologies may also operate in the manner described herein. For example, base station 104 may represent a pair of NR base stations, with one base station acting as a master and the other acting as a secondary.

In various implementations, the selection of the transmission rate 106 is performed by the scheduler 120. The scheduler 120 may determine which channel of available spectrum is to carry the content to the UE 102 and, based on the highest throughput rate for that spectrum, selects the highest throughput rate as the transmission rate 106. The same criteria for transmission rate selection may be used for other spectrum as well, ensuring that the base station 104 utilizes the spectrum available to it at the highest rate(s) for that spectrum.

The scheduler 120 may also select a playback rate 108 for a UE 102 received the content. The scheduler 120 may determine the playback rate 108 based on a type of the content, on a service associated with the content, or on a type of the subscriber associated with the UE 102. Subscriber information could be obtained, for instance, from a subscriber database, such as a home subscriber system (HSS). The scheduler 120 may then convey the playback rate 108 or other information (e.g., content type, service type, subscriber type) to the UE 102 in control messaging 110.

In some implementations, the scheduler 120 may also receive and store buffer indications 122 which may be used in determining when to pause sending of content to a UE 102 and when to resume. When receiving a buffer indication 122, the scheduler 120 may determine if a buffer threshold is exceeded and, if so, may halt transmission. If another lower threshold is met, indicating buffer size may fall below a minimum, the scheduler 120 may resume transmission.

Alternatively, the scheduler 120 may simply receive pause and resume requests from the UE 102, as described above, and may act in accordance with those requests.

When transmission to one UE is paused, the base station 104 may transmit content to another UE over the same spectrum, ensuring that the spectrum is in use as much as possible. And because a highest rate is selected, the base station 104 ensures that available spectrum is used as much as possible and at its highest rate.

FIG. 2 is a block diagram of an example UE that may implement various functionalities described herein. The UE 200 may be used to implement the UE 102, for example.

In various embodiments, the UE 200 may include at least one processing unit 202 and system memory 204. Depending on the exact configuration and type of computing device, the system memory 204 may be volatile (such as RAM), non-volatile (such as ROM, flash memory, etc.) or some combination of the two. The system memory 204 may include a communication stack 206, playback applications 208, buffer(s) 210, and other modules and data 212. The communication stack 206, playback applications 208, and buffer(s) 210 may be configured to perform the operations described further herein, including receipt and rendering of content and receipt or determination of the playback rate. Such components and operations are described further herein in detail. The other modules and data 212 may perform other operations of the UE 200.

The UE 200 may also include additional data storage devices (removable and/or non-removable) such as, for example, magnetic disks, optical disks, or tape. Such additional storage devices are illustrated in FIG. 2 as storage 214.

Non-transitory computer storage media of the UE 200 may include volatile and nonvolatile, removable and non-removable media, implemented in any method or technology for storage of information, such as computer readable instructions, data structures, program modules, or other data. The system memory 204 and storage 214 are all examples of computer-readable storage media. Non-transitory computer-readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by UE 200. Any such non-transitory computer-readable storage media may be part of the UE 200.

In various embodiments, any or all of the system memory 204 and storage 214 may store programming instructions which, when executed, implement some or all of the function functionality described above.

The UE 200 may also have input device(s) 216 such as a keypad, a touch-sensitive display, voice input device, etc. Output device(s) 218 such as a display, speakers, etc. may also be included.

The UE 200 may also include transceiver(s) 220 that allow the UE 200 to communicate with other devices, such as base station 104. Such transceiver(s) 220 may include at least a single radio to transmit and receive radio frequency communications. In some implementations, transceivers may include dual radios for concurrent sending to two access points and/or concurrent receiving from two access points.

Additionally, the UE 200 may include a SIM 222 storing a configuration 224. Such a SIM 222 and configuration 224 are described further herein.

Figure 3:
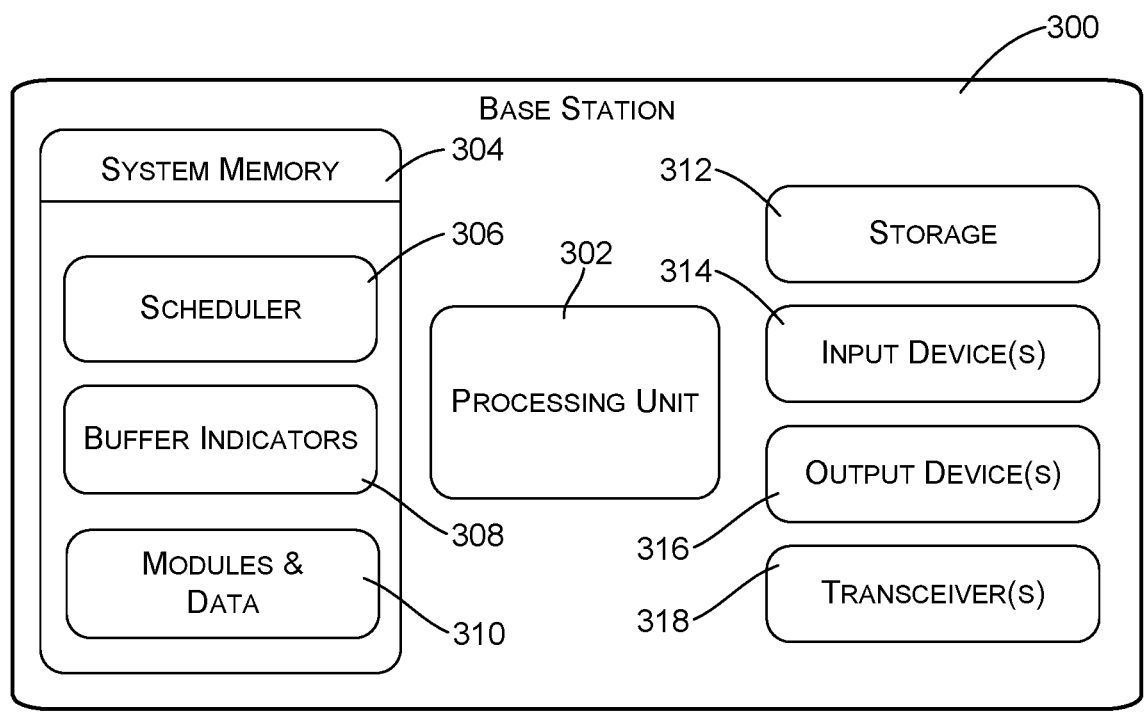
FIG. 3 is a block diagram of an example base station that may implement various functionalities described herein.

FIG. 3 is a block diagram of an example base station that may implement various functionalities described herein. The base station 300 may be used to implement the base stations 104, for example.

In various embodiments, the base station 300 may include at least one processing unit 302 and system memory 304. Depending on the exact configuration and type of computing device, the system memory 304 may be volatile (such as RAM), non-volatile (such as ROM, flash memory, etc.) or some combination of the two. The system memory 304 may include a scheduler 306, buffer indicators 308, and other modules and data 310. The scheduler 306 and buffer indicators 308 may be configured to perform the operations described further herein, including sending content to UEs at a highest available throughput rate for the utilized spectrum. Such components and operations are described further herein in detail. The scheduler 306 and other modules and data 310 may also perform other operations of the base station, such as coordinating use of spectrum among multiple UEs and communicating with other base station(s) and network core.

The base station 300 may also include additional data storage devices (removable and/or non-removable) such as, for example, magnetic disks, optical disks, or tape. Such additional storage devices are illustrated in FIG. 3 as storage 312.

Non-transitory computer storage media of the base station 300 may include volatile and nonvolatile, removable and non-removable media, implemented in any method or technology for storage of information, such as computer readable instructions, data structures, program modules, or other data. The system memory 304 and storage 312 are all examples of computer-readable storage media. Non-transitory computer-readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by base station 300. Any such non-transitory computer-readable storage media may be part of the base station 300.

In various embodiments, any or all of the system memory 304 and storage 312 may store programming instructions which, when executed, implement some or all of the function functionality described above.

The base station 300 may also have input device(s) 314 such as a keyboard, a mouse, a touch-sensitive display, voice input device, etc. Output device(s) 316 such as a display, speakers, a printer, etc. may also be included. The base station 300 may also include transceiver(s) 318 that allow the base station 300 to communicate with other devices, such as other base station(s) and UE 102. Such transceiver(s) 318 may include an antenna to transmit and receive radio frequency communications.

Figure 4:
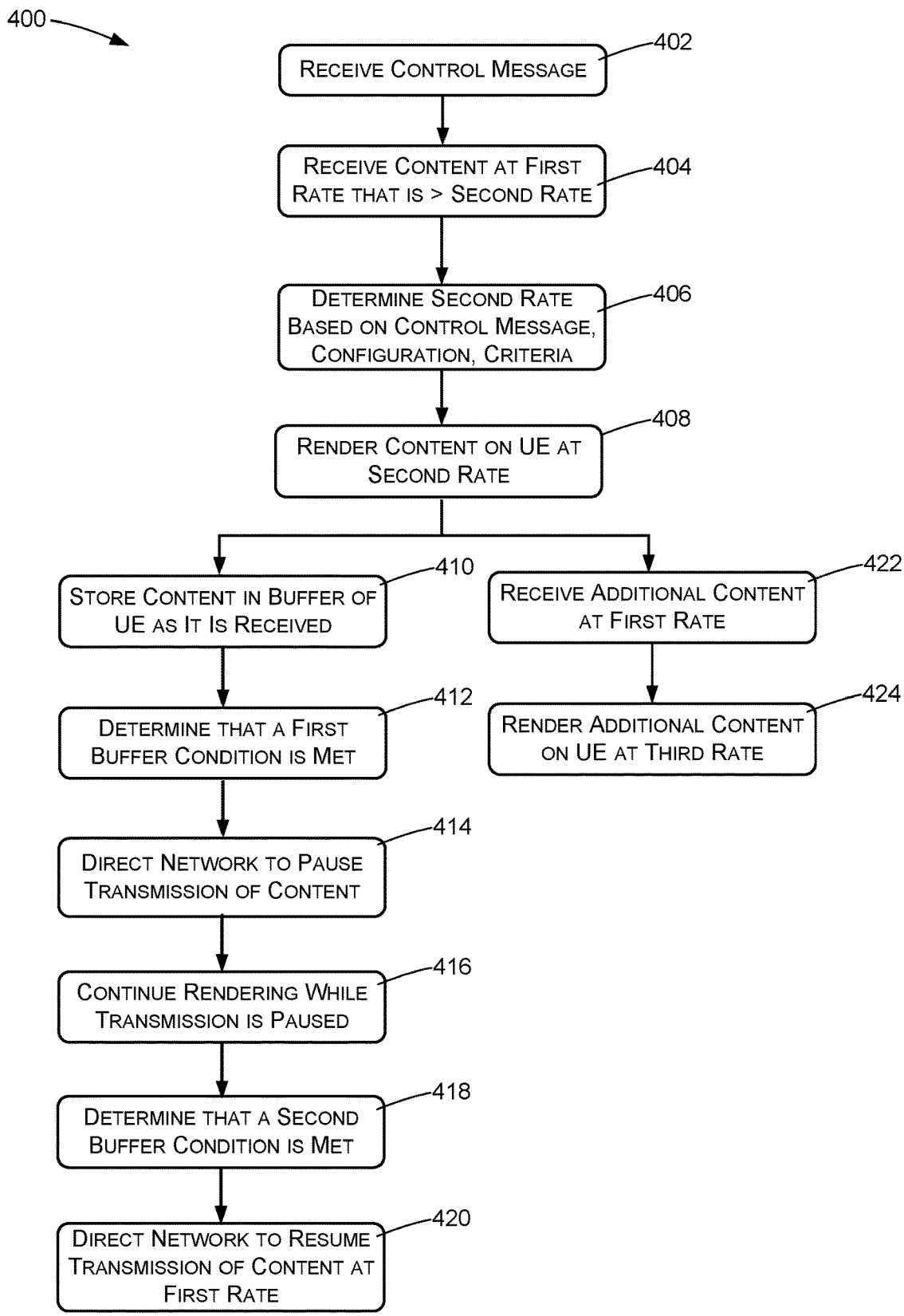
FIG. 4 is a flow diagram illustrating an example method that may be performed by a UE to receive content at a first rate and render that content at a lower, second rate.
Figure 5:
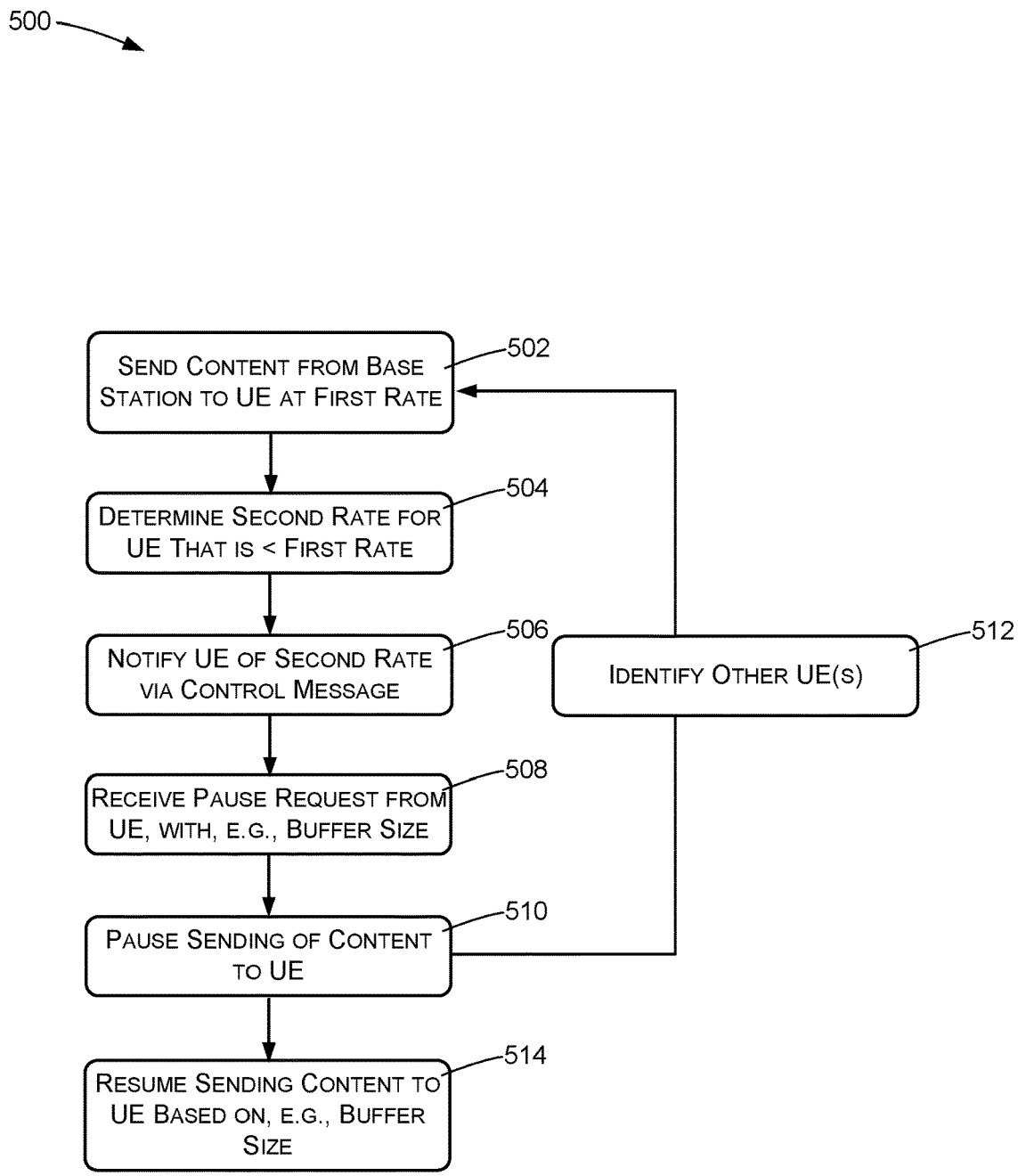
FIG. 5 is a flow diagram illustrating an example method that may be performed by a base station to transmit at a highest throughput rate to different UEs in sequence until each UE requests a pause in transmission.

FIGS. 4 and 5 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

FIG. 4 is a flow diagram illustrating an example method that may be performed by a UE to receive content at a first rate and render that content at a slower, second rate. As illustrated, at 402, the UE may receive a control message from a base station specifying a playback rate. The control message may accompany the content that is to be played back and may be received from the same base station as the content or, in an NSA architecture, a master base station paired to the content-providing base station. In such implementations, the content-providing base station may be a secondary base station in a master-secondary base station with the master base station. Further, the secondary base station may implement a NR access network providing the content at a highest possible rate for spectrum utilized by the NR access network.

At 404, the UE receives content delivered by the telecommunication network (e.g., via the base station/secondary base station) at a transmission rate. The transmission rate is a highest rate possible for transmitting the content via the radio frequency spectrum of the telecommunication network (e.g., a highest possible rate for spectrum utilized by the NR access network).

At 406, the UE may determine a playback rate for the received content. The playback rate is lower than the transmission rate. The UE may determine the playback rate based on a control message or on a configuration stored in a SIM of the UE. That specified playback rate may in turn be determined based on at least one of a type of the content, a service associated with the content, or a type of subscriber associated with the UE.

At 408, the UE then renders the content at the playback rate.

At 410, while receiving the content, the UE may store the content in a buffer of the UE. Such receiving, storing, and rendering as shown at 404, 408, and 410 may happen concurrently, with any unit within the content (e.g., a frame) being received at 404, then stored at 410, then rendered at 408.

At 412, the UE may determine that a first buffer condition is met. Such a condition may indicate, e.g., a degree of buffer fullness. At 414, the UE may then direct the telecommunication network to pause transmission of the content to the UE. At 416, while transmission is paused, the UE may continue rendering from the content stored in the buffer.

At 418, the UE may determine that a second buffer condition is met. Such a second condition may indicate, e.g., that the buffer has fallen to a certain level. At 420, the UE may then direct the telecommunication network to resume transmission of the content to the UE at the transmission rate.

Concurrently with, or before or after 410-420, the UE may receive, at 422, additional content delivered by the telecommunication network at the transmission rate and, at 424, render the additional content at a playback rate that is different from the playback rate used for the content at 408.

FIG. 5 is a flow diagram illustrating an example method that may be performed by a base station to transmit at a highest throughput rate to different UEs in sequence until each UE requests a pause in transmission. As illustrated, at 502, a base station may send content from itself to a UE at a transmission rate. The transmission rate is a highest rate possible for transmitting the content via the radio frequency spectrum of the telecommunication network (e.g., a highest possible rate for spectrum utilized by a NR access network, when the base station is a NR base station).

At 504, the base station may determine a playback rate for playback of the content at the recipient UE. The playback rate may be lower than the transmission rate and may be determined based on at least one of a type of the content, a service associated with the content, or a type of subscriber associated with the UE.

At 506, along with sending the content, the base station may send a control message to the UE specifying the determined playback rate. In some implementations, such as NSA implementations, the control message may be communicated by a master base station paired with the content-sending base station.

At 508, the base station may receive a request to pause sending of the content to the UE and, at 510, the base station may pause sending of the content to the UE.

At 512, while transmission to the UE is paused, the base station may identify other UE(s) and perform operations 502-510 with respect to the other UE(s). By switching to a different UE when transmission is paused, the base station ensures full utilization of telecommunication network spectrum.

At 514, the base station may resume sending content to the UE. Such resumption may be based on a request from the UE and/or based on UE buffer size measurements tracked by the base station. Such resumption may follow pausing sending to a different UE or may utilize a different part of the telecommunication network spectrum.

Although features and/or methodological acts are described above, it is to be understood that the appended claims are not necessarily limited to those features or acts. Rather, the features and acts described above are disclosed as example forms of implementing the claims.

What is claimed is:

1. A non-transitory computer-readable medium having programming instructions stored thereon that, when executed by a computer processor of a base station, cause the base station to perform operations comprising:
    sending first content from the base station to a first user equipment (UE) at a first rate, wherein the first rate is a highest rate possible for transmission from the base station;
    determining a second rate based on at least one of a type of the first content, a service associated with the first content, or a type of subscriber associated with the first UE, wherein the second rate is lower than the first rate;
    sending a control message to the first UE instructing the first UE to perform playback of the first content at the second rate;
    receiving a request to pause the sending of the first content to the first UE;
    pausing the sending of the first content to the first UE;
    sending second content from the base station to a second UE at the first rate;
    determining a third rate based on at least one of a type of the second content, a service associated with the second content, or a type of subscriber associated with the second UE, wherein the third rate is lower than the first rate;
    sending a second control message to the second UE instructing the second UE to perform playback of the first content at the third rate;
    receiving a request to pause the sending of the second content to the second UE;
    pausing the sending of the second content to the second UE; and
    resuming the sending of the first content to the first UE at the first rate,
    wherein the second rate and the third rate are independent of one another.

2. The non-transitory computer-readable medium of claim 1, wherein the base station is a secondary base station in a master-secondary relationship with a primary base station, and the primary base station sends the control message, receives the request to pause the sending of the first content, receives the request to pause the sending of the second content, and instructs the base station to pause the sending of the first content and the second content.

3. The non-transitory computer-readable medium of claim 1, wherein the operations further comprise receiving a buffer status of a buffer of the first UE and the resuming is based at least in part on the buffer status.

4. The non-transitory computer-readable medium of claim 1, wherein the base station is a new radio (NR) base station providing content at a highest possible rate for spectrum utilized by NR technology.

5. A method implemented by a base station, comprising:
    sending first content from the base station to a first user equipment (UE) at a first rate, wherein the first rate is a highest rate possible for transmission from the base station;
    determining a second rate based on at least one of a type of the first content, a service associated with the first content, or a type of subscriber associated with the first UE, wherein the second rate is lower than the first rate;
    sending a control message to the first UE instructing the first UE to perform playback of the first content at the second rate;
    receiving a request to pause the sending of the first content to the first UE;
    pausing the sending of the first content to the first UE;
    sending second content from the base station to a second UE at the first rate;
    determining a third rate based on at least one of a type of the second content, a service associated with the second content, or a type of subscriber associated with the second UE, wherein the third rate is lower than the first rate;
    sending a second control message to the second UE instructing the second UE to perform playback of the first content at the third rate;
    receiving a request to pause the sending of the second content to the second UE;
    pausing the sending of the second content to the second UE; and
    resuming the sending of the first content to the first UE at the first rate,
    wherein the second rate and the third rate are independent of one another.

6. The method of claim 5, wherein the base station is a secondary base station in a master-secondary relationship with a primary base station, and the primary base station sends the control message, receives the request to pause the sending of the first content, receives the request to pause the sending of the second content, and instructs the base station to pause the sending of the first content and the second content.

7. The method of claim 5, further comprising receiving a buffer status of a buffer of the first UE, and the resuming is based at least in part on the buffer status.

8. The method of claim 5, wherein the base station is a new radio (NR) base station providing content at a highest possible rate for spectrum utilized by NR technology.

9. A base station comprising:

a processor; and programming instructions that, when executed by the processor, cause the base station to perform operations comprising:

sending first content from the base station to a first user equipment (UE) at a first rate, wherein the first rate is a highest rate possible for transmission from the base station;

determining a second rate based on at least one of a type of the first content, a service associated with the first content, or a type of subscriber associated with the first UE, wherein the second rate is lower than the first rate;

sending a control message to the first UE instructing the first UE to perform playback of the first content at the second rate;

receiving a request to pause the sending of the first content to the first UE;

pausing the sending of the first content to the first UE;

sending second content from the base station to a second UE at the first rate;

determining a third rate based on at least one of a type of the second content, a service associated with the second content, or a type of subscriber associated with the second UE, wherein the third rate is lower than the first rate;

sending a second control message to the second UE instructing the second UE to perform playback of the first content at the third rate;

receiving a request to pause the sending of the second content to the second UE;

pausing the sending of the second content to the second UE; and resuming the sending of the first content to the first UE at the first rate, wherein the second rate and the third rate are independent of one another.

10. The base station of claim 9, wherein the base station is a secondary base station in a master-secondary relationship with a primary base station, and the primary base station sends the control message, receives the request to pause the sending of the first content, receives the request to pause the sending of the second content, and instructs the base station to pause the sending of the first content and the second content.

11. The base station of claim 9, wherein the operations further comprise receiving a buffer status of a buffer of the first UE and the resuming is based at least in part on the buffer status.

12. The base station of claim 9, wherein the base station is a new radio (NR) base station providing content at a highest possible rate for spectrum utilized by NR technology.

* * * * *